United States Patent
Suematsu

(10) Patent No.: US 8,916,307 B2
(45) Date of Patent: Dec. 23, 2014

(54) FUEL CELL SYSTEM

(75) Inventor: Keigo Suematsu, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 617 days.

(21) Appl. No.: 13/143,271

(22) PCT Filed: Jan. 5, 2010

(86) PCT No.: PCT/JP2010/000010
§ 371 (c)(1),
(2), (4) Date: Jul. 5, 2011

(87) PCT Pub. No.: WO2010/082453
PCT Pub. Date: Jul. 22, 2010

(65) Prior Publication Data
US 2011/0269046 A1 Nov. 3, 2011

(30) Foreign Application Priority Data
Jan. 13, 2009 (JP) .................. 2009-004371

(51) Int. Cl.
*H01M 8/04* (2006.01)
*H01M 8/06* (2006.01)

(52) U.S. Cl.
CPC ...... *H01M 8/04641* (2013.01); *H01M 8/04828* (2013.01); *Y02E 60/50* (2013.01)
USPC .......................................... 429/443; 429/413

(58) Field of Classification Search
USPC .......................................... 429/443, 413, 414
See application file for complete search history.

(56) References Cited

U.S. PATENT DOCUMENTS

| 6,376,110 B1 * | 4/2002 | Koschany ............. 429/413 |
| 2006/0074574 A1 | 4/2006 | Gasda et al. | |

FOREIGN PATENT DOCUMENTS

| EP | 1898483 A1 | 3/2008 |
| JP | 2004-146267 A | 5/2004 |
| JP | 2007-012419 A | 1/2007 |
| JP | 2007-128665 A | 5/2007 |
| JP | 2007-173071 A | 7/2007 |
| JP | 2007-265895 A | 10/2007 |
| JP | 2008-103156 A | 5/2008 |
| JP | 2008-166236 A | 7/2008 |

OTHER PUBLICATIONS

International Search Report issued Apr. 6, 2010 of PCT/JP2010/000010.

* cited by examiner

*Primary Examiner* — Patrick Ryan
*Assistant Examiner* — Julian Anthony
(74) *Attorney, Agent, or Firm* — Kenyon & Kenyon LLP

(57) ABSTRACT

The degree of dryness in a fuel cell can be judged more accurately. A system has: an impedance calculation part that calculates an impedance of a fuel cell, extracts from the calculated impedance a high-frequency impedance which is an impedance in a high frequency range and a low-frequency impedance which is an impedance in a low frequency range, and subtracts the high-frequency impedance from the low-frequency impedance to calculate a differential impedance; a water content calculation part that calculates the water content of an electrolyte membrane using the high-frequency impedance and calculates the water content of a catalyst layer using the differential impedance; and a water content control part that performs water content recovery processing to increase the water content of the catalyst layer if the water content of the catalyst layer is smaller than a predetermined water content.

4 Claims, 4 Drawing Sheets

FUEL CELL SYSTEM

This is a 371 national phase application of PCT/JP2010-000010 filed 5 Jan. 2010, claiming priority to Japanese Patent Application No. 2009-004371 filed 13 Jan. 2009, the contents of which are incorporated herein by reference.

TECHNICAL FIELD

The present invention relates to a fuel cell system.

BACKGROUND ART

It is known that internal resistance of a fuel cell is affected by the degree of dryness of an electrolyte membrane of the fuel cell. More specifically, if the water content in the fuel cell becomes insufficient and the electrolyte membrane dries (which is a state known as "dry-up"), the fuel cell internal resistance increases and the output voltage of the fuel cell decreases. In order to operate the fuel cell efficiently, the water content in the fuel cell should be controlled in an optimum state. The water content in the fuel cell has a correlation with an impedance of the fuel cell. Thus, the water content in the fuel cell can be found indirectly, for example, by measuring an impedance of the fuel cell through an AC impedance method. Patent Document 1 indicated below discloses a technique in which an impedance of a fuel cell is measured by superimposing a high frequency signal and a low frequency signal onto an output signal of the fuel cell, and after that, whether dry-up occurs or not is determined using an impedance in a high frequency range and an impedance in a low frequency range, which impedances are extracted from the above-measured impedance.

PRIOR ART REFERENCES

Patent Documents

Patent Document 1: Japanese laid-open patent publication No. 2007-12419

SUMMARY OF THE INVENTION

Problem to be Solved by the Invention

A catalyst layer is stacked on each of the two outer sides of the electrolyte membrane. Accordingly, when dry-up proceeds, the catalyst layer, which is located outside the electrolyte membrane, becomes dry first relative to the electrolyte membrane. The above-indicated conventional technique judges dry-up in accordance with the water content of the electrolyte membrane, etc., but the water content of the catalyst layer, in which drying proceeds faster, is not taken into consideration. Thus, there is room for improvement in terms of accurate judgment of the degree of dryness in the fuel cell.

The invention has been made to solve the above-stated problem in the conventional art, and an object of the invention is to provide a fuel cell system that can judge the degree of dryness in a fuel cell more accurately.

Means for Solving the Problem

In order to solve the above-stated problem, a fuel cell system according to the invention has: a fuel cell having a membrane-electrode assembly in which both surfaces of an electrolyte membrane are sandwiched between a pair of catalyst layers, the fuel cell being supplied with reactant gas to generate electric power through an electrochemical reaction of the reactant gas; an impedance calculation part that calculates a first impedance which is an impedance of the fuel cell in a first frequency range and which corresponds to resistance of the electrolyte membrane, and also calculates a second impedance which is an impedance of the fuel cell in a second frequency range which is lower than the first frequency range; and water content calculation means that calculates water content of the fuel cell by using a differential impedance which is a difference between the second impedance and the first impedance.

According to the invention, the water content of the fuel cell can be calculated using a differential impedance which is a difference between a first impedance which is an impedance in a first frequency range and which corresponds to the resistance of the electrolyte membrane of the fuel cell and a second impedance which is an impedance in a frequency range lower than the first frequency range. In other words, the water content corresponding to the resistance of a portion outside the electrolyte membrane can be calculated. Accordingly, it is possible to judge the degree of dryness in the fuel cell based on the water content of a portion which is easier to dry than the electrolyte membrane.

In the above fuel cell system, the water content calculation means can calculate the water content of the catalyst layer using the differential impedance.

As a result, it is possible to judge the degree of dryness in the fuel cell based on the water content of the catalyst layer which is located outside the electrolyte membrane and is easier to dry than the electrolyte membrane.

The above fuel cell system may further have a water content control means that performs water content recovery processing to increase the water content of the catalyst layer if the water content of the catalyst layer calculated by the water content calculation means is smaller than a predetermined water content that is set so as to prevent the catalyst layer from drying.

As a result, it is possible to increase the water content of the catalyst layer before the catalyst layer dries up.

In the above fuel cell system, the fuel cell may have a plurality of unit cells each having the above-described membrane-electrode assembly, and in that system, the impedance calculation part can calculate the first impedance and the second impedance for each of the unit cells, the water content calculation means can calculate the water content of the catalyst layer for each of the unit cells using the differential impedance obtained for each of the unit cells, and the water content control means can perform the water content recovery processing if the water content of the catalyst layer calculated for each of the unit cells includes at least one water content smaller than the predetermined water content.

As a result, the degree of dryness of the catalyst layer can be found for each of the unit cells, and even if the catalyst layer of some of the unit cells dries, the water content of the catalyst layer can be recovered.

In the above fuel cell system, the impedance calculation part can calculate the first impedance and the second impedance for each divided section prepared by dividing a surface of the unit cell, and calculate the first impedance and the second impedance for each of the unit cells by using the first impedance and the second impedance calculated for each of the divided sections.

As a result, even if the degree of dryness varies in a surface of a unit cell, it is possible to calculate the water content taking the dryness in a local portion of the unit cell into consideration.

Effect of the Invention

According to the invention, the degree of dryness of a fuel cell can be judged more accurately.

MODE FOR CARRYING OUT THE INVENTION

A preferred embodiment of the fuel cell system according to the invention will be described below with reference to the attached drawings. The below embodiment will be described regarding the case where the fuel cell system according to the invention is utilized as an on-vehicle power generating system for a fuel cell vehicle (FCHV; Fuel Cell Hybrid Vehicle).

Figure 1:
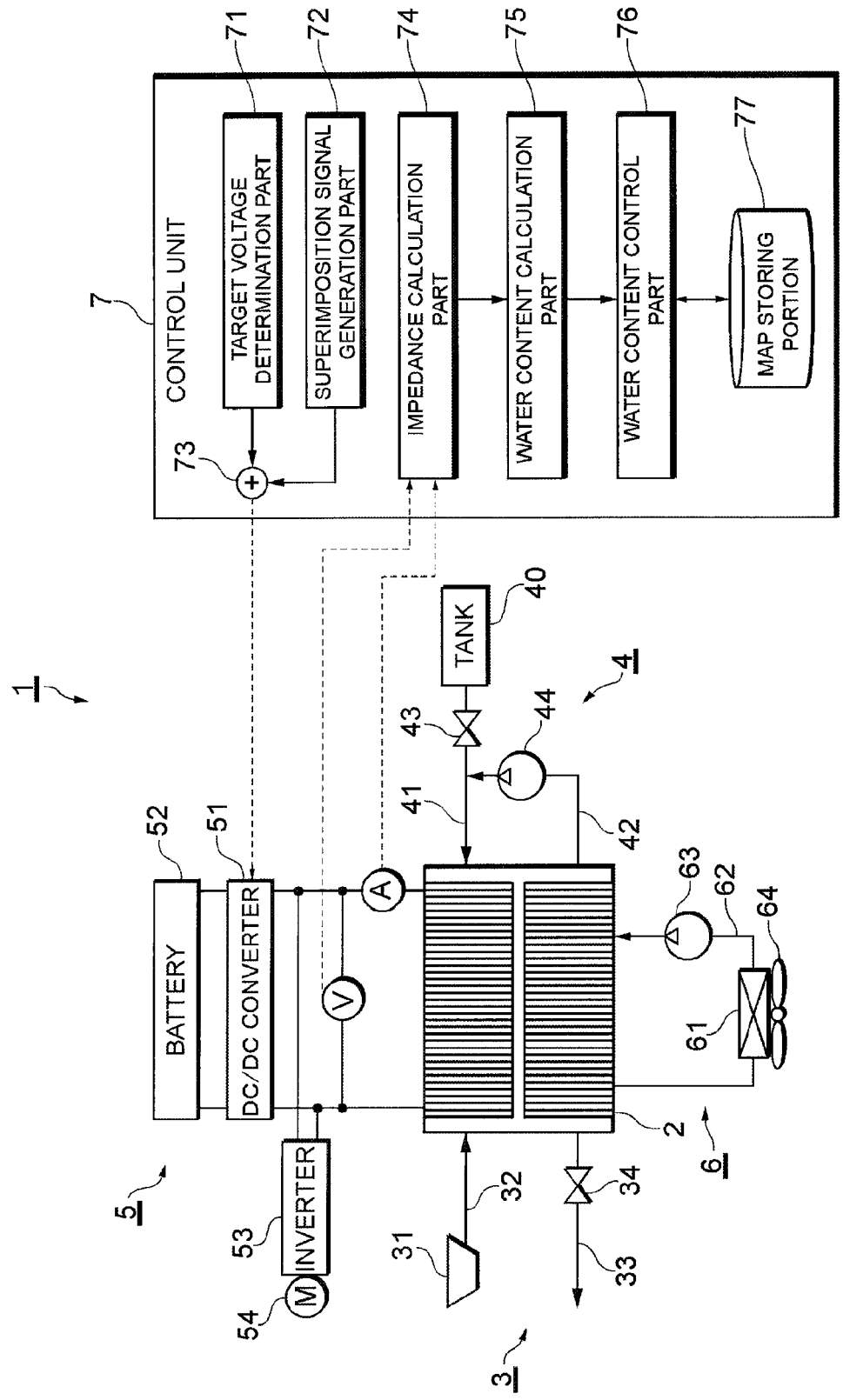
FIG. 1 is a configuration diagram schematically illustrating a fuel system according an embodiment of the invention.

Referring first to FIG. 1, the configuration of a fuel cell system according to the embodiment will be described. FIG. 1 is a configuration diagram schematically illustrating a fuel cell system according to the embodiment.

As illustrated in FIG. 1, a fuel cell system 1 has: a fuel cell 2 that receives the supply of an oxidant gas and a fuel gas serving as reactant gases and generates electric power through the electrochemical reaction; an oxidant gas pipe system 3 that supplies air serving as an oxidant gas to the fuel cell 2; a hydrogen gas pipe system 4 that supplies hydrogen serving as a fuel gas to the fuel cell 2; a power system 5 that performs electric power charge and discharge of the system; a cooling system 6 that supplies cooling water to the fuel cell 2 in a circulating manner; and a control unit 7 that performs overall control of the entire system.

The fuel cell 2 is, for example, a polymer electrolyte type fuel cell having a stack structure formed of a number of stacked unit cells. Each unit cell has: an MEA (Membrane-Electrode Assembly) in which an electrolyte membrane constituted from an ion exchange membrane of a solid polymer material is sandwiched between catalyst layers which are a pair of electrodes (cathode and anode); a pair of diffusion layers that sandwich the MEA therebetween; and a pair of separators that further sandwich the MEA and the diffusion layers therebetween.

The electrolyte membrane is a proton-conducting ion exchange membrane formed of a hydrous polymer material, such as a fluorocarbon-based or a hydrocarbon-based polymer material. The catalyst layers include a catalyst of, for example, platinum or a platinum alloy to promote the electrochemical reaction. The diffusion layers are constituted by a gas-permeable electron-conducting member. The diffusion layers are made of, for example, carbon paper containing carbon fiber as its major component. The separators are prepared by using, for example, a base material of carbon. The separators are gas-impermeable carbon-group composite separators obtained by impregnating the base material with a certain amount of predetermined resin, and have electric conductivity.

In the fuel cell 2 structured as above, a hydrogen gas is supplied to a hydrogen gas flow path in one of the separators, while an oxidant gas is supplied to an oxidant gas flow path in the other separator, and the supplied reactant gases react chemically to generate electric power. The fuel cell 2 is provided with a voltage sensor V for detecting an output voltage of the fuel cell and a current sensor A for detecting an output current of the fuel cell.

The oxidant gas pipe system 3 has: a compressor 31 that compresses air taken in through a filter and sends out the compressed air as an oxidant gas; an oxidant gas supply flow path 32 for supplying the oxidant gas to the fuel cell 2; and an oxidant-off gas discharge flow path 33 for discharging the oxidant-off gas discharged from the fuel cell 2. The oxidant-off gas discharge flow path 33 is provided with a back-pressure valve 34 that regulates the pressure of the oxidant gas within the fuel cell 2.

The hydrogen gas pipe system 4 has: a hydrogen tank 40 serving as a fuel supply source in which high-pressure hydrogen gas is stored; a hydrogen gas supply flow path 41 serving as a fuel gas supply flow path for supplying the hydrogen gas in the hydrogen tank 40 to the fuel cell 2; a hydrogen circulation flow path 42 serving as a fuel circulation flow path for returning the hydrogen-off gas discharged from the fuel cell 2 back to the hydrogen gas supply flow path 41. The hydrogen gas supply flow path 41 is provided with a regulator 43 that regulates the pressure of the hydrogen gas to a predetermined secondary pressure. The hydrogen circulation flow path 42 is provided with a hydrogen pump 44 that compresses the hydrogen-off gas within the hydrogen circulation flow path 42 and pumps out the gas to the hydrogen gas supply flow path 41.

The power system 5 has: a DC/DC converter 51; a battery 52 serving as a secondary battery; a traction inverter 53; a traction motor 54; and various auxiliary device inverters not shown in the drawing. The DC/DC converter 51 is a direct-current voltage converter, and has a function of adjusting a direct-current voltage input from the battery 52 and outputting the adjusted voltage to the traction inverter 53 and a function of adjusting a direct-current voltage input from the fuel cell 2 or from the traction motor 54 and outputting the adjusted voltage to the battery 52.

The battery 52 is constituted by stacked battery cells and has a certain high voltage as its terminal voltage. Under the control of a battery computer not shown in the drawing, the battery 52 is charged with surplus electric power or supplies electric power as a supplementary power supply. The traction inverter 53 converts a direct current to a three-phase alternating current and supplies it to the traction motor 54. The traction motor 54 is, for example, a three-phase AC motor, and constitutes a major power source of the fuel cell vehicle in which the fuel cell system 1 is installed. The auxiliary device inverters are motor controllers for controlling the drive of various motors, converting a direct current to a three-phase alternating current and supplying it to the various motors.

The cooling system 6 has: a radiator 61 that cools cooling water; a cooling water flow path 62 for supplying the cooling water to the fuel cell 2 and the radiator 61 in a circulating manner; and a cooling water pump 63 for making the cooling water circulate through the cooling water flow path 62. The radiator 61 is provided with a radiator fan 64.

The control unit 7 measures the amount of operation of an accelerating member (e.g., accelerator) provided in the fuel cell vehicle, receives control information such as the required amount of acceleration (e.g., the amount of power generation required by power consuming devices such as the traction motor 54), and controls the operation of various devices in the system. Examples of the power consuming device include, in addition to the traction motor 54, auxiliary devices necessary to operate the fuel cell 2 (e.g., motors for the compressor 31, the hydrogen pump 44, the cooling water pump 63, the radiator fan 64, etc.), actuators used in various devices involved in the running of the vehicle (a speed change gear, wheel controller, steering device, suspension, etc.), and an air-conditioning device (air conditioner), lighting device, audio system, etc., provided in a passenger space.

The control unit 7 physically has a CPU, a memory and an input/output interface. The memory includes, for example, a ROM for storing control programs and control data to be processed by the CPU, and a RAM mainly used as various working areas for control processing. These components are connected to each other via buses. Connected to the input/output interface are various sensors including the voltage sensor V and various drivers for driving the compressor 31, etc.

In accordance with the control programs stored in the ROM, the CPU receives the results of measurement at various sensors through the input/output interface, and processes them using various data, etc., in the RAM, thereby executing various types of control processing. Also, by outputting control signals to the various drivers through the input/output interface, the CPU controls the fuel cell system 1 as a whole. The following is a description regarding the water content control processing performed by the control unit 7 of this embodiment.

Figure 2:
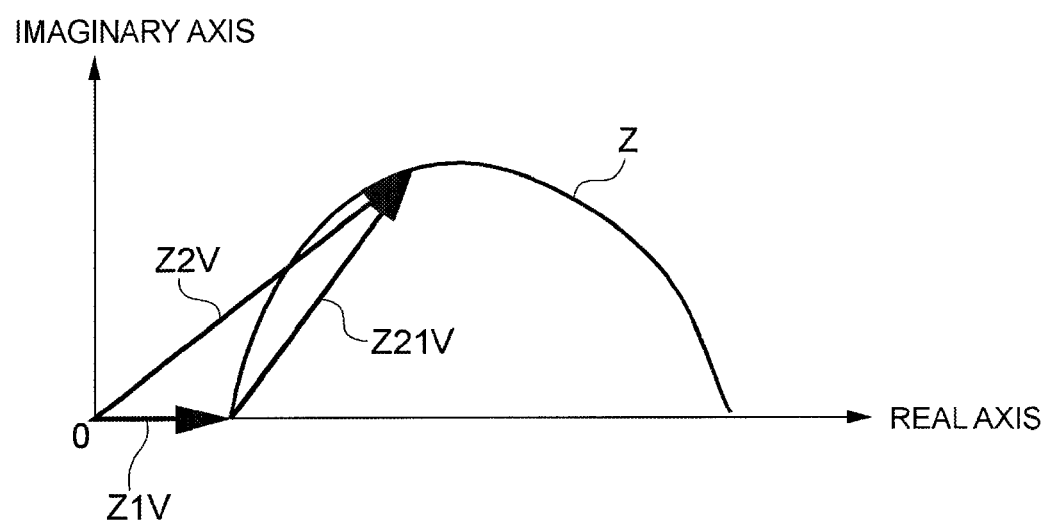
FIG. 2 is a chart illustrating, in a complex plane, the results of measurement of an impedance of a fuel cell with an AC impedance method.

Before describing the water content control processing, an impedance of a fuel cell will be explained referring to FIG. 2. FIG. 2 is a chart illustrating, in a complex plane, the results of measurement of an impedance of a fuel cell with a typical AC impedance method. The impedance curve Z shown in FIG. 2 is obtained by measuring an impedance of the fuel cell 2 at given frequencies under predetermined conditions and plotting the change of impedance with the change of frequency in a complex plane.

Z1V in FIG. 2 shows a vector of an impedance of the fuel cell 2 at a high frequency of around 1 KHz (hereinafter called the "high-frequency impedance" (first impedance)). Z2V shows a vector of an impedance of the fuel cell 2 at a low frequency of around 100 Hz (hereinafter called the "low-frequency impedance" (second impedance)). Z21V shows a vector of a differential impedance which is obtained by subtracting the high-frequency impedance from the low-frequency impedance.

The high-frequency impedance is known as corresponding to the value of resistance of the electrolyte membrane of the fuel cell 2. Also, as shown in FIG. 2, an impedance of the fuel cell 2 increases with the decrease of the measurement frequency. In other words, if the value of the measurement frequency is decreased from a frequency corresponding to the high-frequency impedance, the value of resistance of a portion outside the electrolyte membrane is gradually added. In view of this principle, the inventor of the present invention carried out a study concerning the impedance which corresponds to the sum of the resistance value of the electrolyte membrane of the fuel cell 2 and the resistance value of the catalyst layer located outside the electrolyte membrane, and found that the impedance of the fuel cell 2 at around 100 Hz, namely, the low-frequency impedance, corresponds to the sum of the respective resistance values of the electrolyte membrane and the catalyst layer of the fuel cell 2. Accordingly, the resistance value of the catalyst layer of the fuel cell 2 can be obtained by calculating a differential impedance through subtraction of the high-frequency impedance from the low-frequency impedance. Note that the resistance value of the catalyst layer can be correlated with the water content of the catalyst layer in the same manner that the resistance value of the electrolyte membrane can be correlated with the water content of the electrolyte membrane.

Accordingly, by detecting the degree of dryness based on the water content corresponding to the resistance value of the catalyst layer, the degree of dryness in the fuel cell can be controlled in a more suitable manner. The function of the control unit 7 that performs such water content control processing will be described in detail below.

The control unit 7 functionally has a target voltage determination part 71, a superimposition signal generation part 72, a voltage command signal generation part 73, an impedance calculation part 74, a water content calculation part 75 and a water content control part 76.

The target voltage determination part 71 determines a target voltage to be output (e.g., 300 V) based on various sensor signals input from an acceleration pedal sensor (not shown in the drawing), etc., and outputs the determined output target voltage to the voltage command signal generation part 73.

The superimposition signal generation part 72 generates an impedance measurement signal (e.g., a specific frequency sinusoidal signal having an amplitude of 2 V) to be superimposed on the output target voltage, and outputs the generated impedance measurement signal to the voltage command signal generation part 73. The impedance measurement signal includes two types of sinusoidal signals—a low-frequency sinusoidal signal and a high-frequency sinusoidal signal. Herein, "low frequency" refers to, for example, a frequency range of around 100 Hz (hereinafter called a "low-frequency range") and "high frequency" refers to, for example, a frequency range of around 1 KHz (hereinafter called a "high-frequency range"). Note that the respective values of the low frequency and high frequency to be used in impedance measurement should not necessarily be limited to the above-indicated values. Also, the output target voltage and the parameters (the type of waveform, frequency, amplitude) of the impedance measurement signal can arbitrarily be set depending on the system design, etc. In addition, the amplitude of the impedance measurement signal can arbitrarily be changed by a superimposition signal amplitude control part (not shown in the drawing).

The voltage command signal generation part 73 superimposes the impedance measurement signal on the output target voltage and outputs it as a voltage command signal to the DC/DC converter 51. The DC/DC converter 51 controls the voltage of the fuel cell 2, etc., in accordance with the input voltage command signal.

The impedance calculation part 74 samples the output voltage of the fuel cell 2 (hereinafter called the "FC voltage") detected by the voltage sensor V and the output current of the fuel cell 2 (hereinafter called the "FC current") detected by the current sensor A at a predetermined sampling rate, and carries out Fourier transformation processing (FFT calculation or DFT calculation), etc. The impedance calculation part 74 calculates an impedance of the fuel cell 2, for example, by dividing the FC voltage signal after the Fourier transformation by the FC current signal after the Fourier transformation, and extracts the high-frequency impedance and the low-frequency impedance from the resulting impedance. The impedance calculation part 74 calculates a differential impedance by subtracting the high-frequency impedance from the low-frequency impedance. The impedance calculation part 74 outputs the obtained high-frequency impedance, low-frequency impedance and differential impedance to the water content control part 76.

The impedance calculation part 74 shown in FIG. 1 can calculate the impedance of the fuel cell 2 by using an impedance measured, for example, per stack, per unit cell, or per divided section of the unit cell, each section being prepared by dividing the surface of the unit cell. The steps for calculating the impedance per stack are as described above in the explanation of the impedance calculation part 74.

The steps for calculating the impedance per unit cell will be described below. The impedance calculation part 74 first calculates the impedance for each unit cell and extracts the high-frequency impedance and the low-frequency impedance from each of the resulting impedances. Next, the impedance calculation part 74 calculates the sum of the respective high-frequency impedances extracted, and also calculates the sum of the respective low-frequency impedances extracted. As a result, the high-frequency impedance and the low-frequency impedance of the fuel cell 2 can be calculated.

The steps for calculating the impedance per divided section of the unit cell will be described below. The impedance calculation part 74 first calculates the impedance for each divided section of the unit cell, and extracts the high-frequency impedance and the low-frequency impedance from each of the obtained impedances. Next, the impedance calculation part 74 calculates, with respect to each unit cell, the sum of the products obtained by multiplying each of the extracted high-frequency impedances by the area of the divided section of the unit cell corresponding to that high-frequency impedance. Also, the impedance calculation part 74 calculates, with respect to each unit cell, the sum of the products obtained by multiplying each of the extracted low-frequency impedances by the area of the divided section of the unit cell corresponding to that low-frequency impedance. As a result, the high-frequency impedance for each unit cell and the low-frequency impedance for each unit cell can be calculated. After that, the impedance calculation part 74 calculates the sum of the high-frequency impedances of the respective unit cells, and the sum of the low-frequency impedances $Z2$ of the respective unit cells. As a result, the high-frequency impedance and the low-frequency impedance of the fuel cell 2 can be calculated.

The water content calculation part 75 calculates the water content of the electrolyte membrane using the high-frequency impedance. The water content calculation part 75 also calculates the water content of the catalyst layer using the differential impedance. Here, in the case where the impedance calculation part 74 calculates the impedance of the fuel cell 2 using the impedances measured for each unit cell or for each divided section of the unit cell, the water content calculation part 75 calculates the water content of the electrolyte membrane and the water content of the catalyst layer, for example, in the following manner.

Figures 3A, 3B, 3C:
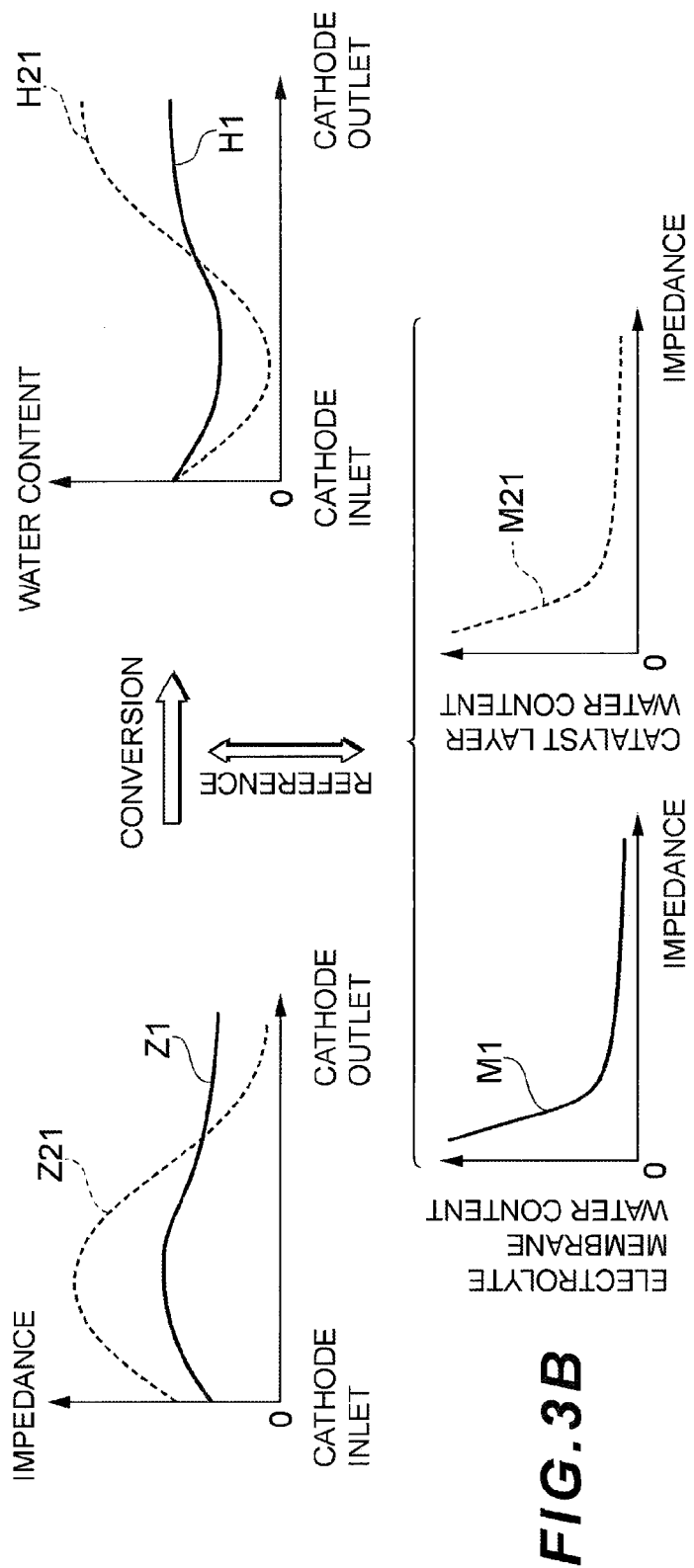
FIG. 3 is an illustration for explaining the process for calculating the water content of an electrolyte membrane and the water content of a catalyst layer from a high-frequency impedance and a differential impedance.

A specific description will be provided with reference to FIG. 3. First, as shown in FIG. 3(A), the high-frequency impedance $Z1$ per unit cell and the differential impedance $Z21$ per unit cell are calculated by the impedance calculation part 74. Next, the water content calculation part 75 refers to an electrolyte membrane water content map M1 showing the correlation between the high-frequency impedance and the water content of the electrolyte membrane and a catalyst layer water content map M21 showing the correlation between the differential impedance and the water content of the catalyst layer, both maps shown in FIG. 3(B), and converts the high-frequency impedance $Z1$ per unit cell and the differential impedance $Z21$ per unit cell, which are shown in FIG. 3(A), respectively to an electrolyte membrane water content H1 and a catalyst layer water content H21 as shown in FIG. 3(C). As a result, the electrolyte membrane water content curve H1 per unit cell and the catalyst layer water content curve H21 per unit cell shown in FIG. 3(C) are obtained. Note that the electrolyte membrane water content map M1 and the catalyst layer water content map M21 are prepared in advance by experiment, etc., and stored in a map storing portion 77 (memory).

The water content control part 76 shown in FIG. 1 performs water content recovery processing to increase the water content of the catalyst layer when the catalyst layer water content calculated by the water content calculation part 75 is smaller than a predetermined water content. Examples of such a predetermined water content include a water content which is determined to prevent the drying of the catalyst layer.

Examples of the water content recovery processing may include: cathode stoichiometry reducing processing to reduce cathode stoichiometry by the reduction of the flow rate of the compressor 31; oxidant gas humidifying processing to humidify the oxidant gas, for example, by injecting water into the oxidant gas supply flow path 32; oxidant gas back-pressure increasing processing to increase the back-pressure of the oxidant gas by adjusting the back-pressure valve 34; anode stoichiometry increasing processing to increase anode stoichiometry by the increase of the supply of hydrogen gas; anode stoichiometry reducing processing to reduce anode stoichiometry by the reduction of the supply of hydrogen gas; cooling water temperature decreasing processing to decrease the temperature of the cooling water, for example, by actuating the radiator fan 64; and cooling water amount increasing processing to increase the flow rate of the cooling water, for example, by actuating the cooling water pump 63.

Here, if the impedance calculation part 74 calculates the impedance of the fuel cell 2 using the impedances measured for each unit cell or for each divided section of the unit cell, the water content control part 76 judges whether to perform the water content recovery processing, for example, in the following manner.

Figure 4:
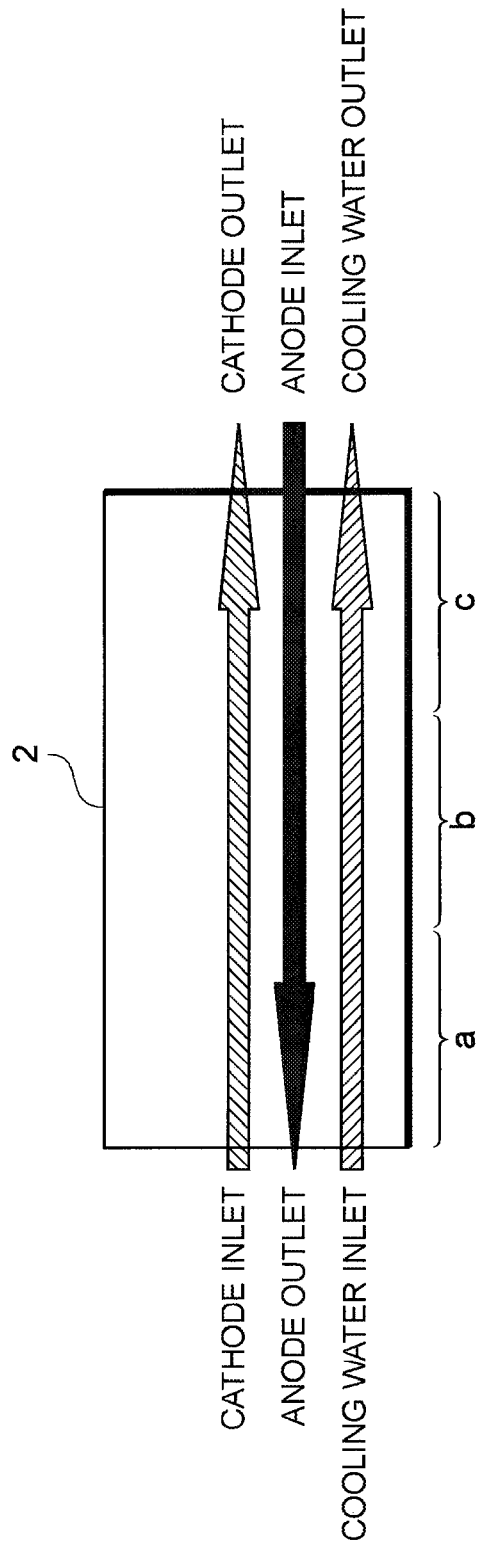
FIG. 4 is an illustration for explaining the position of a unit cell in a fuel cell stack.

Using the catalyst layer water content curve H21 per unit cell shown in FIG. 3(C), the water content control part 76 compares the catalyst layer water content per unit cell with a predetermined water content serving as a threshold value, and determines whether there is a catalyst layer water content that is smaller than the predetermined water content. If there is at least one catalyst layer water content that is smaller than the predetermined water content, the water content control part 76 performs the water content recovery processing to increase the water content of the catalyst layer. The water content recovery processing can be performed in a manner set out below, depending on the position of the unit cell (see FIG. 4) for which the water content has been determined as being smaller than the predetermined water content.

If the unit cell for which the water content has been determined as being smaller than the predetermined water content is located on the side close to the cathode inlet (area a in FIG. 4), at least one of the above-mentioned cathode stoichiometry reducing processing, oxidant gas humidifying processing, anode stoichiometry increasing processing and cooling water inlet temperature decreasing processing can effectively be performed. When performing the cathode stoichiometry reducing processing, an outflow of water due to the oxidant gas can be reduced. When performing the oxidant gas humidifying processing, the water content in the oxidant gas can be increased. When performing the anode stoichiometry increasing processing, water circulating from the cathode outlet to the anode inlet can be returned from the anode into the stack. When performing the cooling water inlet temperature decreasing processing, an outflow of water through evaporation can be suppressed.

If the unit cell for which the water content has been determined as being smaller than the predetermined water content is located in the center portion between the cathode inlet and outlet (area b in FIG. 4), at least one of the above-mentioned cooling water amount increasing processing and cooling water temperature decreasing processing can effectively be performed. When performing the cooling water amount increasing processing, the thermal conductivity of the separator can be increased, so that the cooling ability of the cooling water can be improved and the temperature of the cooling water can be decreased. As a result, in a similar way to the above-described cooling water temperature decreasing processing, an outflow of water through evaporation can be suppressed.

If the unit cell for which the water content has been determined as being smaller than the predetermined water content is located on the side close to the cathode outlet (area c in FIG. 4), at least one of the above-mentioned cathode stoichiometry reducing processing, oxidant gas back-pressure increasing processing, anode stoichiometry reducing processing and cooling water outlet temperature decreasing processing can effectively be performed. When performing the oxidant gas back-pressure increasing processing, the pressure of the oxidant gas can be increased and thus an outflow of water can be suppressed. When performing the anode stoichiometry reducing processing, an outflow of water from the anode can be suppressed. When performing the cooling water outlet temperature decreasing processing, an outflow of water through evaporation can be suppressed.

As described above, according to the fuel cell system 1 of this embodiment, the water content of the fuel cell 2 can be calculated using the differential impedance Z21, which is a difference between the high-frequency impedance Z1 that corresponds to the resistance of the electrolyte membrane of the fuel cell 2 and the low-frequency impedance Z2 that corresponds to the resistance of the electrolyte membrane and the catalyst layer of the fuel cell 2. Accordingly, the degree of dryness in the fuel cell can be judged based on the water content of the catalyst layer which is located outside the electrolyte membrane and which is easier to dry than the electrolyte membrane, and as a result, the degree of dryness in the fuel cell can be judged more accurately.

Also, since the water content recovery processing can be performed if the water content of the catalyst layer is smaller than a predetermined water content, the water content of the catalyst layer can be increased before the catalyst layer dries up.

Also, since the water content of the electrolyte membrane and the water content of the catalyst layer can be calculated for each unit cell by calculating the impedance per unit cell, the degree of dryness of the catalyst layer can be judged for each unit cell. Accordingly, even if the catalyst layer of some of the unit cells dries, the water content of the catalyst layer can be recovered.

Also, since the water content of the electrolyte membrane and the water content of the catalyst layer can be calculated for each unit cell by calculating the impedance for each divided section of the unit cell, even if the degree of dryness varies within a surface of the unit cell, it is possible to calculate the water content taking the dryness in a local portion of the unit cell into consideration.

In the above embodiment, the water content control part 76 performs the water content recovery processing if the water content of the catalyst layer is smaller than a predetermined water content; however, the conditions to perform the water content recovery processing are not limited to the above. For example, the water content recovery processing may be performed if the differential impedance Z21 shown in FIG. 3(A) is larger than a predetermined impedance. Examples of such a predetermined impedance include an impedance which is set to prevent the drying of the catalyst layer.

Although the above embodiment has been described regarding the case where the fuel cell system according to the invention is installed in a fuel cell vehicle, the fuel cell system according to the invention can also be utilized in various moving objects (robots, ships, airplanes, etc.) other than fuel cell vehicles. In addition, the fuel cell system according to the invention may also be applied to stationary power generation systems used as power generation equipment for constructions (houses, buildings, etc.).

INDUSTRIAL APPLICABILITY

The fuel cell system according to the invention is suited for judging the degree of dryness in the fuel cell more accurately.

DESCRIPTION OF REFERENCE NUMERALS

1 . . . fuel cell system; 2 . . . fuel cell; 3 . . . oxidant gas pipe system; 4 . . . hydrogen gas pipe system; 5 . . . power system; 6 . . . cooling system; 7 . . . control unit; 31 . . . compressor; 32 . . . oxidant gas supply flow path; 33 . . . oxidant-off gas discharge flow path; 34 . . . back-pressure valve; 40 . . . hydrogen tank; 41 . . . hydrogen gas supply flow path; 42 . . . hydrogen circulation flow path; 43 . . . regulator; 44 . . . hydrogen pump; 51 . . . DC/DC converter; 52 . . . battery; 53 . . . traction inverter; 54 . . . traction motor; 61 . . . radiator; 62 . . . cooling water flow path; 63 . . . cooling water pump; 64 . . . radiator fan; 71 . . . target voltage determination part; 72 . . . superimposition signal generation part; 73 . . . voltage command signal generation part; 74 . . . impedance calculation part; 75 . . . water content calculation part; 76 . . . water content control part; 77 . . . map storing portion

The invention claimed is:

1. A fuel cell system comprising:
    a fuel cell having a membrane-electrode assembly in which both surfaces of an electrolyte membrane are sandwiched between a pair of catalyst layers, the fuel cell being supplied with reactant gas to generate electric power through an electrochemical reaction of the reactant gas;
    an impedance calculation part is programmed to calculate a first impedance which is an impedance of the fuel cell in a first frequency range and which corresponds to resistance of the electrolyte membrane, and also calculates a second impedance which is an impedance of the fuel cell in a second frequency range which is lower than the first frequency range; the second impedance corresponding to the sum of resistance of the electrolyte membrane and resistance of the catalyst layer; and
    a water content calculation part is programmed to calculate a differential impedance which is a difference between the second impedance and the first impedance, and, by referring to a correlation between the differential impedance and water content of the catalyst layer, the correlation having been stored in a memory in advance, calculates the water content of the catalyst layer that corresponds to the calculated differential impedance.

2. The fuel cell system according to claim 1, further comprising a water content control device that performs water content recovery processing to increase the water content of the catalyst layer if the water content of the catalyst layer calculated by the water content calculation part is smaller than a predetermined water content that is set to prevent the catalyst layer from drying.

3. The fuel cell system according to claim 2, wherein:
the fuel cell has a plurality of unit cells each having the membrane-electrode assembly;
the impedance calculation part is programmed to calculate the first impedance and the second impedance for each of the unit cells;
the water content calculation part is programmed to calculate the water content of the catalyst layer for each of the unit cells by using the differential impedance obtained for each of the unit cells; and
the water content control device performs the water content recovery processing if the water content of the catalyst layer calculated for each of the unit cells includes at least one water content smaller than the predetermined water content.

4. The fuel cell system according to claim 3, wherein the impedance calculation part is programmed to calculate the first impedance and the second impedance for each divided section prepared by dividing a surface of the unit cell into a plurality of surfaces, and, by using the first impedance and the second impedance calculated for each of the divided sections, calculates the first impedance and the second impedance for each of the unit cells.

* * * * *